I. CLARK.
FRUIT-GATHERER.
No. 191,833.  Patented June 12, 1877.
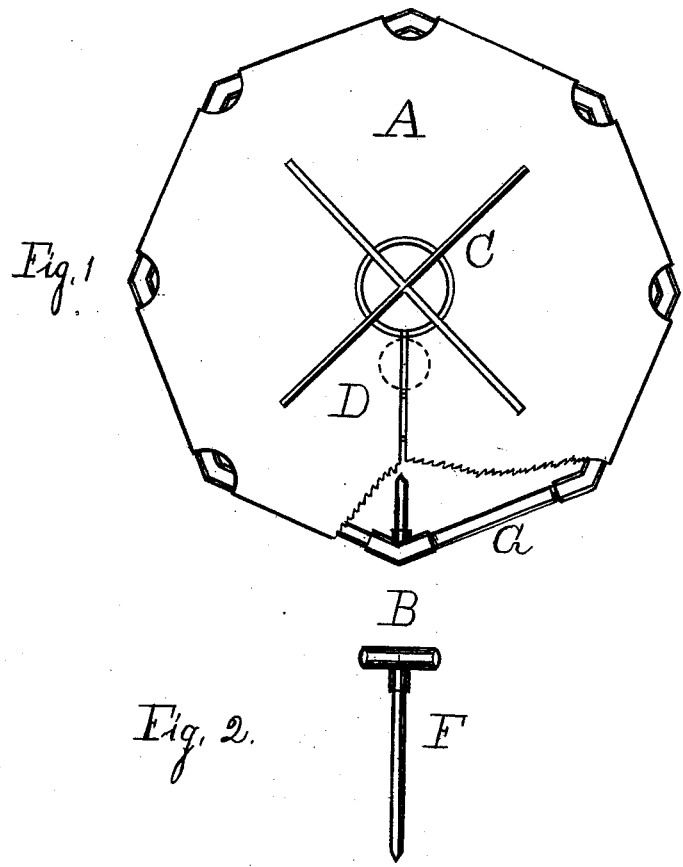

UNITED STATES PATENT OFFICE.

ISSACHAR CLARK, OF TIPPECANOE CITY, OHIO.

IMPROVEMENT IN FRUIT-GATHERERS.

Specification forming part of Letters Patent No. 191,833, dated June 12, 1877; application filed June 4, 1877.

*To all whom it may concern:*

Be it known that I, ISSACHAR CLARK, of Tippecanoe City, State of Ohio, have invented an Improved Fruit-Gatherer, of which the following is a specification:

The object of my invention is to effect the gathering of fruit by sustaining a canvas beneath the tree, upon which the fruit is shaken, the same being supported on a jointed frame supported on legs attached to the joint section or coupling, and the canvas having division-guides to direct the fruit to a common exit.

Figure 1 is a top view of the fruit-gatherer. Fig. 2 illustrates the coupling and leg detached from the other parts.

A represents a canvas, which is attached in any convenient manner to an octagonal frame. The central portion is slightly lower than the periphery, sufficiently so that the fruit falling on the surface will roll to the center.

At the center is provided a tube, which is crossed by two divisions, C, at right angles to each other. The use is to prevent the fruit approaching from opposite sides coming in contact, and thereby prevent bruising from this cause.

The canvas is made open at one side, and the dotted lines at D, which are within the opening, shows the position of the trunk of the tree during the process of gathering. If the tree leaned greatly, or the limbs were chiefly on one side, the gatherer might be set with the trunk of the tree more to one side than the point indicated.

In Fig. 1 a portion of the canvas is cut away to show the construction of the frame, and at Fig. 2 the joint or coupling and leg are shown. The rod G is preferably of iron pipe, and on the ends are cut right and left threads, which enter the couplings B; thus the entire frame is made. On the under side of the couplings are parts extending downward and slightly inward, into which are screwed the several legs F, which serve to support the canvas at a suitable height from the ground.

The operation may be described thus: First erect the frame about the tree, then attach the canvas, and on this the fruit is shaken, which, rolling to the center, drops through the tube into a basket. To have the gatherer set firmly, the legs are forced into the ground.

What I claim as my invention is—

The canvas A, having divisions C, dividing the central tube, in combination with the frame composed of the rods G and couplings B, provided with legs F, substantially as set forth.

ISSACHAR CLARK.

Witnesses:
J. J. BELVILLE,
B. PICKERING.